Aug. 20, 1968  S. D. SIMS ET AL  3,398,379
LASER DEVICE WITH TOTAL INTERNAL REFLECTION
PROPAGATION DIRECTION SELECTION
Filed Jan. 27, 1964  4 Sheets-Sheet 1

INVENTORS
STUART D. SIMS
RICHARD T. DALY
BY Darby & Darby
ATTORNEYS

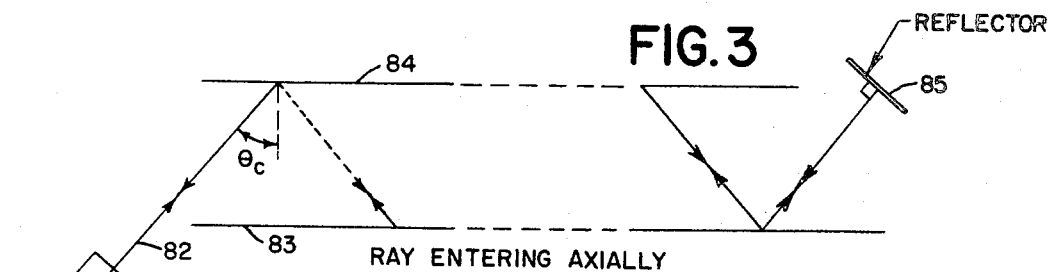
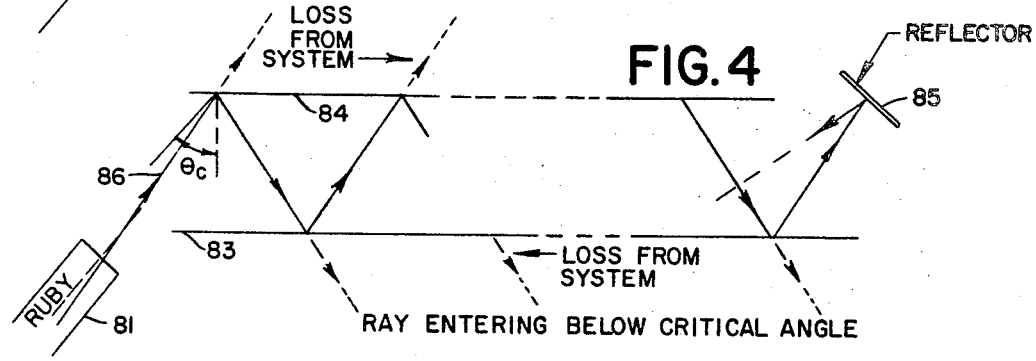
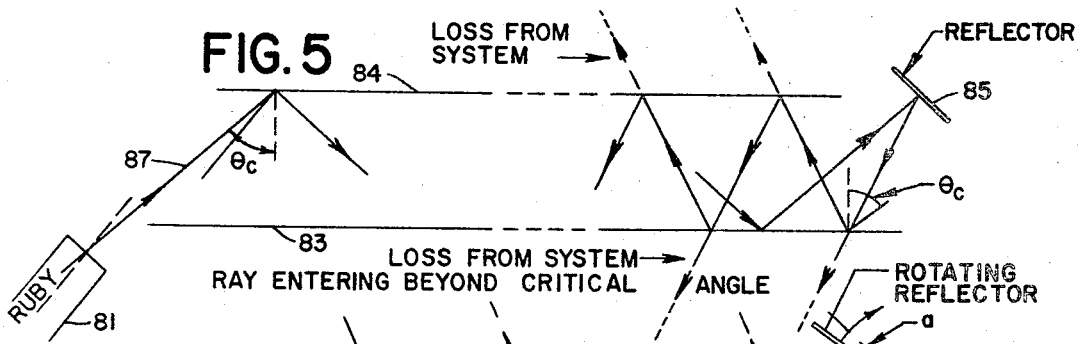
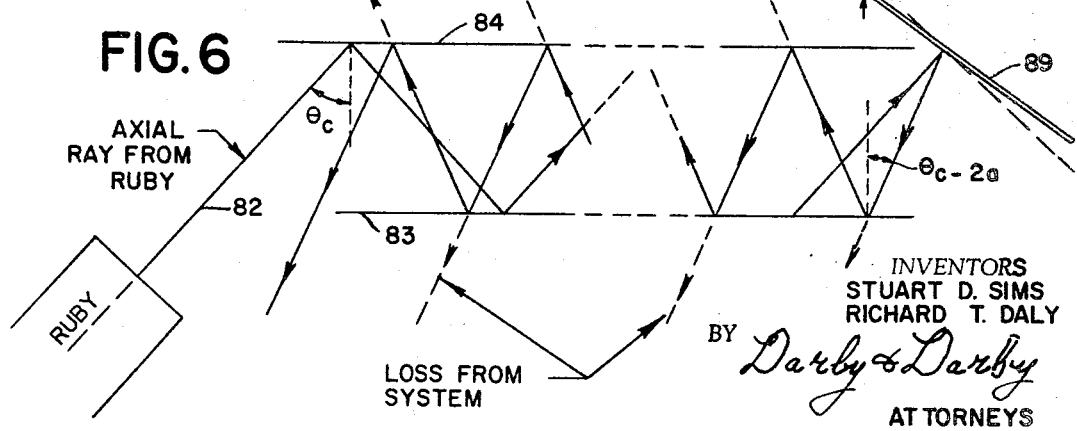

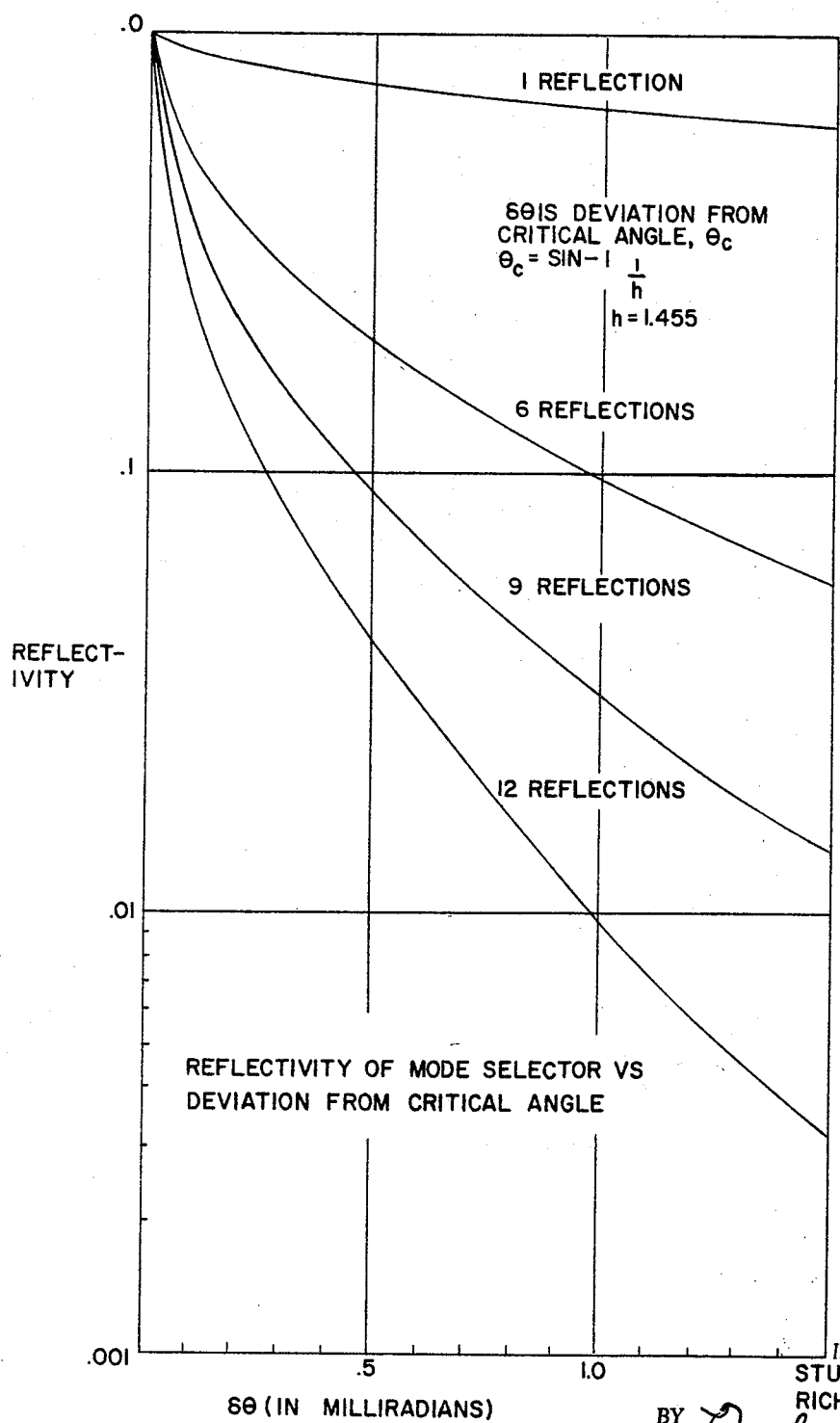

United States Patent Office 3,398,379
Patented Aug. 20, 1968

3,398,379
LASER DEVICE WITH TOTAL INTERNAL REFLEC-
TION PROPAGATION DIRECTION SELECTION
Stuart D. Sims and Richard T. Daly, Huntington, N.Y.,
assignors, by mesne assignments, to Control Data Corporation, South Minneapolis, Minn., a corporation of Minnesota
Filed Jan. 27, 1964, Ser. No. 340,483
7 Claims. (Cl. 331—94.5)

ABSTRACT OF THE DISCLOSURE

The present invention relates to lasers and more particularly to lasers having an optical system employing total internal reflection of a pair of parallel surfaces at substantially the critical angle, relative to a laser beam for causing the light amplified or generated by the laser to be highly directional. The selectivity of the apparatus with respect to direction of propagation may be employed simply to obtain a highly directional output beam or in other instances may be employed in conjunction with a rotating reflector in a Q-switched laser to achieve a faster switching time and hence a greater concentration of energy in a single laser pulse.

---

The present invention is an improvement on the basic idea and apparatus for Q-switching described in copending application Ser. No. 804,540 for "Light Amplifying Device," filed Apr. 6, 1959, in the name of Gordon Gould and assigned to a common assignee with the present application.

As is presently well known, the usual laser device includes an appropriate laser medium, properly energized, so that light passing through the medium will be amplified by the process of light amplification by the stimulated emission of radiation. Such a device usually includes two or more reflectors arranged to cause light rays to repetitively traverse and retraverse a path in the laser medium to provide regenerative amplification and, in the case of a laser generator or oscillator, to provide sufficient gain for oscillation.

In the form of device described immediately above, particularly laser generators or oscillators of such form, it is common to employ a ruby as the laser working medium and to utilize a gas discharge lamp such as a xenon gas discharge lamp to provide the pumping energy or excitation for the laser medium. It is also common to operate such apparatus by pulsing rather than in continuous operation. This has previously been accomplished in a straightforward manner by pulsing the excitation lamps from a condenser bank or other stored energy source. As the pumping light or excitation light is absorbed by the ruby, a population inversion is produced which in turn leads to a potential for amplification of light in the ruby. When sufficient gain is available to overcome the reflection and other losses, the laser will commence to oscillate.

It has been generally characteristic of solid state pulse lasers and particularly of ruby lasers that the output was not produced in a single pulse but that relaxation oscillations were present which caused the over-all pulse output of the laser to comprise a series of short pulses or spikes occurring somewhat randomly and unpredictably.

It was proposed in the aforementioned application Ser. No. 804,540 that an electronic shutter such as a Kerr cell could be introduced within the internal optical system of the laser to provide losses which would prevent oscillation in the laser until the electronic shutter was suddenly opened and that it would thus be possible to achieve a very sharp and intense pulse output from a laser. This technique has come to be known as Q-switching.

It has been found convenient to utilize rapid "shutters" of forms other than the Kerr cell due to the fact that the insertion loss of the Kerr cell is high. That is, even when the Kerr cell is fully "open" it introduces substantial loss in the optical system. It is usually desired to keep losses in the optical system as low as possible and thus the Kerr cell shutter is frequently undesirable. As a substitute for the Kerr cell, a simple rotating reflector or prism may be utilized. The simplest case would be a laser utilizing as a resonator a pair of plain parallel reflectors wherein one of the pair of reflectors was rendered rotatable. Q-switched lasers of this type and somewhat more refined versions utilizing prism reflectors have been employed to generate very intense pulses (hundreds of megawatts peak power). A severe disadvantage with respect to such rotating reflector Q-switch lasers is the fact that the switching action is far less rapid than is possible with other devices such as the Kerr cell. For reasons which will be more fully explained hereinafter, this slow switching makes the Q-switch much less effective than it is potentially capable of being. The present invention utilizes an optical system wherein total internal reflection at nearly the critical angle produces a highly selective propagation of light rays in terms of direction of propagation; as will later be explained, the directional selectivity renders it possible to provide a much faster mechanically Q-switched laser with special advantages to be described.

The laser with high directional selectivity is also useful simply to provide a highly directional beam in applications where Q-switching is not employed and where the laser may, for example, be continuously operated rather than pulsed.

It is an object of the present invention to provide a laser optical system wherein total internal reflection at nearly the critical angle is employed to achieve a high degree of directivity for light generated or amplified by the laser.

It is another object of the present invention to utilize the above-described optical apparatus with total internal reflection at nearly the critical angle in conjunction with a rotating reflector to provide an ultra-fast mechanically Q-switched laser.

Other objects and advantages will be apparent from a consideration of the following description in conjunction with the appended drawings, in which:

FIGURES 3 through 6 are schematic diagrams illustrating the propagation of light through the optical system of the apparatus under various conditions which are presented to aid in the description of the operation of apparatus according to the invention;

FIGURE 7 is a graph of the effective reflectivity of the laser cavity versus deviation from the optimum direction of propagation, i.e., the critical angle.

Figure 1:
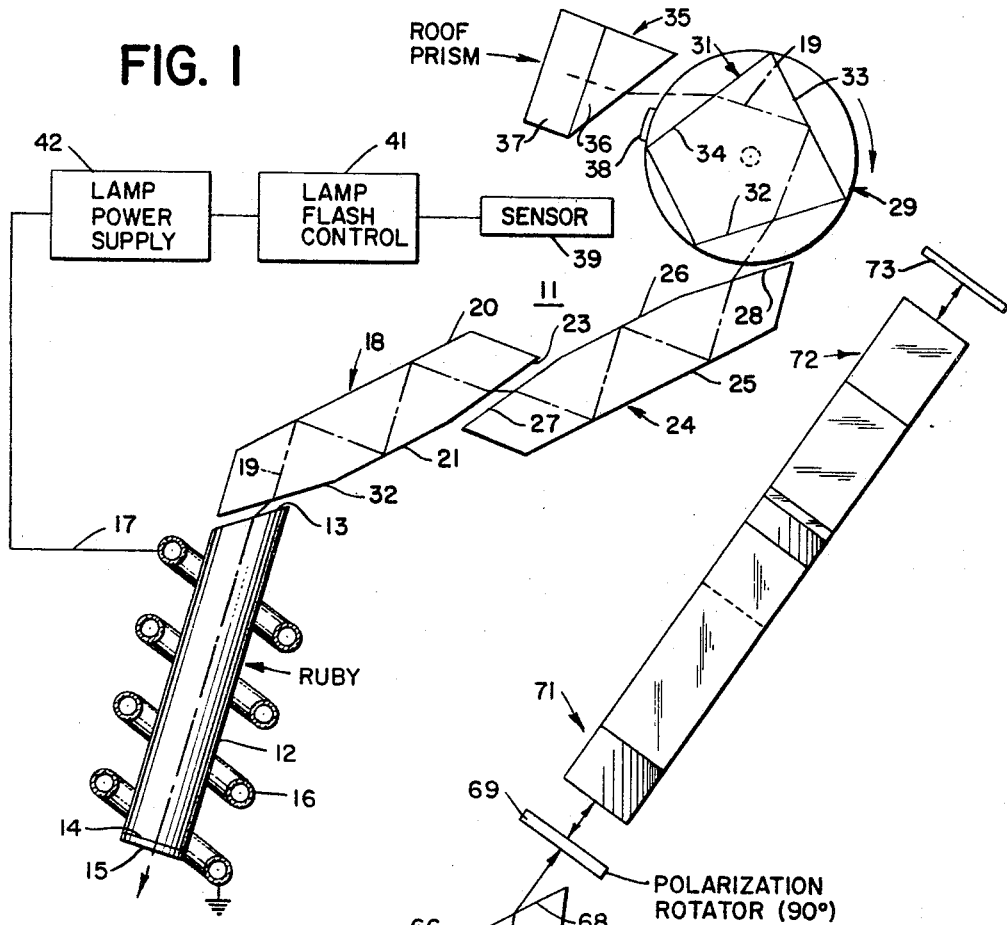
FIGURE 1 is a top plan view, partially schematic, of apparatus according to the present invention including provision for pulsing by Q-switching.

Referring now specifically to FIGURE 1, a Q-switched pulsed laser 11 is shown incorporating propagation direction selection by total internal reflection in accordance with the invention. For the purpose of illustration, the laser working medium 12 may be assumed to be a ruby crystal in the form of cylindrical rod. A reflector 15 may be provided on the lower face 14 of the ruby rod 12 to serve as one of two principal reflectors of a Fabry-Perot type resonator for the laser apparatus.

The reflector 15 will normally be partially transparent and serve as an output window for the laser apparatus. The reflector 15 may comprise a separate element rather than being deposited directly on the ruby rod. In some cases the face of the ruby crystal will in itself provide sufficient (fresnel) reflection without the necessity of any reflective coating.

The upper face 13 of the ruby rod 12 is disposed obliquely with respect to the axis of the ruby rod 12. The angle of the face 13 is preferably arranged so that axial rays in ruby crystal encounter the face 13 at Brewster's angle, thereby providing for substantially a lossless transmission from the ruby crystal.

The ruby working medium comprising rod 12 is optically pumped by a gas discharge lamp 16 which for illustrative purposes is shown as a helical lamp.

There is a rather complicated optical path provided between the ruby rod 12 and the reflector opposed to reflector 15. Rays exiting from face 13 first encounter an optical element 18. The rays from the ruby rod 12 enter the element 18 through an entrance face 22. The optical element 18 may be formed of any material substantially transparent to the wave length of radiation for which the device is operative and will preferably have a moderately high index of refraction. In the specific example of FIGURE 1, the optical element 18 is assumed to be made of quartz which has the advantage of low absorption for the wave length here involved.

Face 22 is preferably also disposed at Brewster's angle with respect to an axial ray from the ruby rod 12. For simplicity of illustration, in FIGURE 1 the index of refraction of the quartz optical element 18 is assumed to be the same as the ruby rod 12, so that face 22 is parallel to face 13, and the ray 19 within optical element 18 is parallel to the axis of ruby rod 12.

The ruby rod 12 is tilted with respect to optical element 18, and particularly the reflecting faces thereof 20 and 21, so that the ray 19 will strike the reflecting face 20 at almost exactly the critical angle. It should be recalled that for an interface between two media having different indices of refraction there is an angle of incidence (looking from the medium of higher refractive index toward the medium of lower refractive index) above which a ray will be totally internally reflected. For lower angles of incidence (that is to say, larger grazing angles) there will be partial transmission through the surface.

For the present, it will suffice to say that the ray 19 is totally internally reflected at very nearly the critical angle from face 20, thence from face 21, and again from face 20, as shown in FIGURE 1. Faces 20 and 21 are parallel, so that the angle of incidence for ray 19 obviously is the same at each of the three reflections within the optical element 18. It should also be mentioned that the light rays referred to are plane polarized by virtue of the fact that the various Brewster angle interfaces discriminate against light of any polarization other than plane polarization in a predetermined direction. All reflecting and transmitting surfaces are designed and arranged in known manner to accommodate the predetermined direction of plane polarization.

The ray 19 exits from optical element 18 through an exit surface 23 which is disposed at Brewster's angle to provide substantially total transmission, and may be symmetrical with the entrance surface 22.

Another optical element 24 is provided which may be substantially a duplicate of optical element 18 and may be provided with an entrance surface 27, reflection faces 25 and 26, and an exit face 28. While the thickness of optical elements 18 and 24 is not shown in FIGURE 1, it will be understood to be at least sufficient to accommodate the entire beam emanating from ruby rod 12. Similar reflections take place in optical element 24 as those previously described with reference to optical element 18.

Upon exiting from optical element 24 the ray 19 next encounters a speed-doubling prism 31 having an entrance face 32 shown disposed at Brewster's angle to the ray 19, a reflecting face 33 and an exit face 34, also shown disposed at Brewster's angle to the beam as reflected from face 33.

The speed-doubling prism 31 is mounted on a rotating table 29 which may be driven by a synchronous motor or otherwise driven at a moderately high speed (in this example fifteen thousand revolutions per minute).

The function of the speed-doubling prism 31, together with retroreflecting prism 35, is to produce a shutter effect similar to that of a rotating flat reflector, but by use of the speed-doubling prism 31 an effect of a rotating reflector with twice the speed of rotation is produced.

The ray 19 emerges from speed-doubling prism 31 and enters the retroreflecting prism 35. Prism 35 is in the form of a roof prism having a first totally internally reflecting face 37 and a second totally internally reflecting face (not shown in FIGURE 1). The roof prism 35 has an entrance and exit face 36 which is obliquely oriented at Brewster's angle to minimize transmission losses. The roof prism 35 is retroreflecting in only one plane. That is, rays entering roof prism 35 will be returned in a direction such that the projection of entering and exiting beams on a plane perpendicular to the ridge of the roof prism will be parallel. In other words, the direction of the beam will be insensitive to changes of relative orientation between the roof prism and the beam around an axis parallel with the ridge of the roof prism. On the other hand, changes in relative orientation of the beam and the roof prism in the plane of the paper in FIGURE 1 will produce the same effect as if the roof prism 35 were a flat reflector.

From the foregoing description, it may be seen that a roof prism 35 is utilized in FIGURE 1 to preserve a high degree of sensitivity to the orientation of the beam with respect to the prism in the plane of the paper, at the same time substantially eliminating any severe criticality of orientation perpendicular thereto. Thus, the shutter effect is maintained, but any problem with respect to critical orientation of the axis of the rotating prism 31 or other elements is substantially eliminated.

In further discussion of operation of the device the operation will sometimes be explained in terms of a rotating flat reflector which would ideally produce the same effect as the apparatus comprising prisms 31 and 35 in FIGURE 1 (although its speed of rotation would have to be twice as great). While it is contemplated that the rotating shutter element will usually be continuously rotated, it may in certain instances be desired to accelerate the shutter to high speed by a spring or other mechanism to trigger a single laser pulse.

As will later be more fully explained, the optical apparatus thus far described serves to introduce large losses in the laser cavity except when the rotating prism 31 is precisely aligned to cause ray 19 to be returned in the same direction back and forth through the apparatus including optical elements 18 and 24. Various forms of timing devices can be utilized to pulse lamp 16 somewhat in advance of the firing position for rotating prism 31. For example, a sensor element 39 is illustrated schematically which cooperates with a trigger element 38 to produce the proper timing for the firing of lamp 16. Sensor element 39 and trigger element 38 may be magnetic, photoelectric, or of any other of various known forms to provide a signal whenever the trigger element 38 passes in proximity to the sensor 39. Obviously the position of the trigger 38 is determined by the time which is to be allowed between excitation of lamp 16 and the firing of the laser, and of course taking into account the speed of rotation of table 29.

Sensor 39 provides a trigger signal to lamp flash control element 41 which in turn actuates lamp power supply 42, connected to lamp 16 by electrical lead 17.

The operation of the speed-doubling prism 31 and the retroflecting roof prism 35 are in themselves not responsible for the improved operation of the apparatus according to the invention. It is rather the operation of the optical elements 18 and 24 which primarily provides the high degree of directional selectivity and hence the rapid pulsing which is an important advantage of the invention.

The operation of the optical elements 18 and 24 can best be understood by reference to FIGURES 3 through 6. In these figures, for simplicity, rotating prism 31 and retroreflecting prism 35 have been replaced by their functional equivalent, namely, a flat reflector (shown as rotatable in FIGURE 6).

Returning to FIGURE 3, a ruby rod of a laser is shown at 81 from which ray 82 is emitted to be totally internally reflected between surfaces 83 and 84. (The Brewster's angle entrance and exit faces are omitted for simplicity.)

In FIGURE 3 it is assumed that the ray 82 strikes reflecting faces 83 and 84 exactly at the critical angle $\theta_c$.

The ray is accordingly totally internally reflected alternately from faces 84 and 83 until it emerges and strikes reflector 85. It is assumed in FIGURE 3 that reflector 85 is oriented so that ray 82 is normal to reflector 85 and is thus returned back through the optical element comprising surfaces 83 and 84 in the same direction as upon its first pass through the system. Since ray 82 strikes reflecting faces 83 and 84 at the critical angle in passing back and forth through the system, it is totally internally reflected in all cases, and there is substantially no loss through faces 83 and 84.

In FIGURE 4 a different situation is considered in which the only change from FIGURE 3 is that a ray 86 is emitted from ruby 81 which is not axial and strikes reflecting face 84 at an angle less than the critical angle. Thus there is not total internal reflection from faces 83 or 84 at this or subsequent reflections of ray 86, and substantial loss of light energy results before ray 86 reaches reflector 85. Thus the loss of optical system may be rendered highly dependent upon the direction of propagation of ray 86, and of course the direction selectivity can be increased by increasing the number of reflections in the system.

FIGURE 5 shows the situation with respect to a ray 87 which enters the system to strike reflecting face 84 at an angle of incidence greater than the critical angle. The ray 87 is totally internally reflected until it strikes reflector 85 and starts its return path. On the return path it strikes reflecting faces 83 and 84 at less than the critical angle and encounters losses by transmission through faces 83 and 84.

FIGURE 6 illustrates the situation in which the losses in the system are dependent upon the orientation of a rotatable reflector 89 with respect to an axial ray from the ruby laser rod. This is analogous to but somewhat different from the previous situation in which the reflector was considered fixed and losses for various directions of propagation of a ray were considered. The direction of the axial ray 82 from the ruby may be considered to be fixed by a flat reflector at the other extremity of the ruby rod which is not shown in FIGURE 6.

In FIGURE 6 the rotating reflector 89 is illustrated in a position slightly counter-clockwise from the position of reflector 85 in FIGURE 3. The reflector 89 may be assumed to be rotating in a clockwise direction.

The ray 82 passes from left to right between reflecting faces 83 and 84 with total internal reflection as described with reference to FIGURE 3. Upon striking reflector 89, it is not returned in the same direction, however, and is in fact deflected so that it strikes faces 83 and 84 at less than the critical angle, thus causing loss from the system upon the return from right to left through the system.

It will be seen that substantial loss is present as reflector 89 rotates until it reaches a position corresponding to position of reflector 85 in FIGURE 3, at which time the ray 82 passes back and forth through the system with total internal reflection at all incidences upon faces 83 and 84, thus eliminating substantially all energy losses at faces 83 and 84. An idea of the relationship between the losses and the angular orientation of reflector 89 can be obtained by reference to FIGURE 7.

FIGURE 7 is a graph of effective reflectivity of the system comprising reflecting surfaces 83 and 84 in FIGURES 3 through 6, for example, there being four different plots respectively for systems having one reflection, six reflections, nine reflections, and twelve reflections. It should be observed at this point that the apparatus of FIGURE 1 is illustrated with two optical elements 18 and 24, each providing three reflections for a total of six reflections. A greater or lesser number of reflections may be provided as may be required in any particular application of the invention. It may, for example, be advantageous to provide four optical elements rather than two, thereby obtaining twelve reflections.

The curve for twelve internal reflections on one pass in FIGURE 7, shows a 10% to 100% switching interval for a 0.2 milliradian rotation of the spinning reflector. (This does not take into account angle doubling of the apparatus in FIGURE 1.)

At a spinning speed of 30,000 r.p.m. this corresponds to a switching interval of 70 nanoseconds. This speed is sufficiently fast to achieve optimum concentration of energy in a single laser output pulse. A speed of 15,000 r.p.m. which would be required for the speed-doubling prism 31 is not inordinately difficult of attainment.

Figure 8:
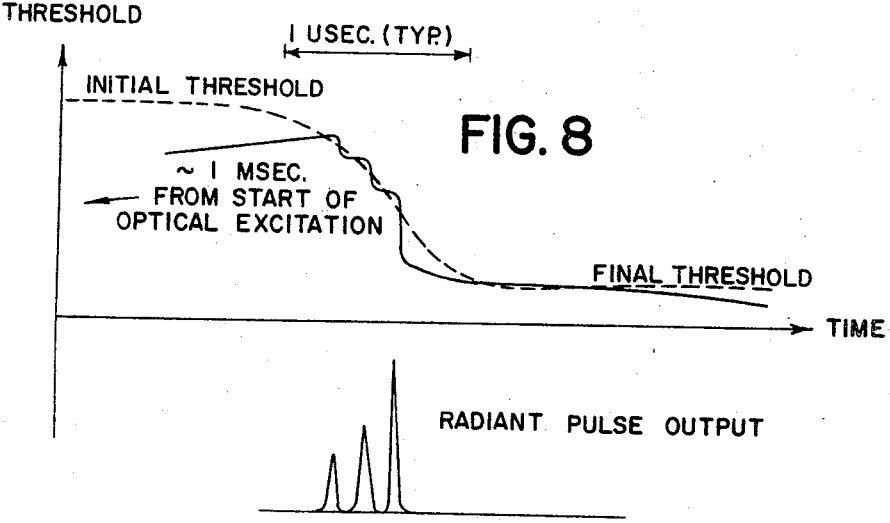
FIGURE 8 is a graph of stored energy and radiant pulse output versus time, for Q-switched laser apparatus of the slow-switching type.
Figure 9:
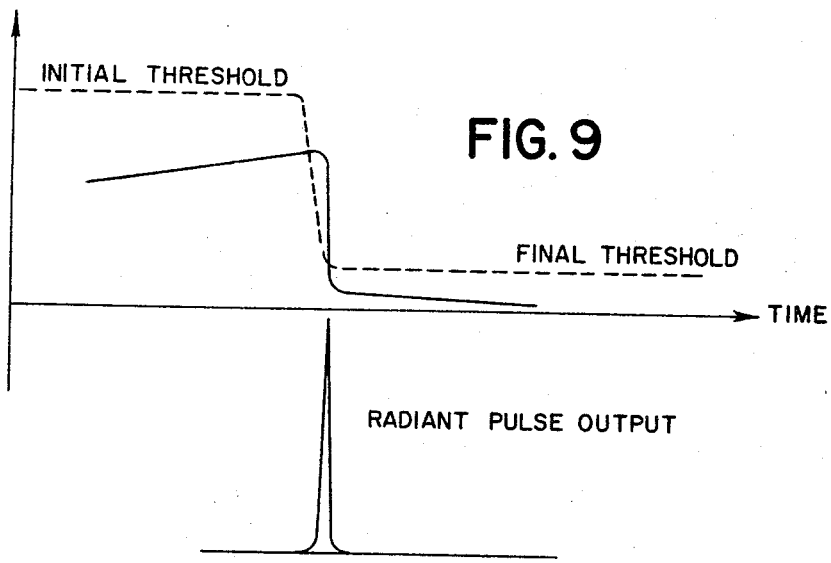
FIGURE 9 is a graph of stored energy and radiant pulse output versus time for the fast Q-switching apparatus according to the present invention.

The importance of rapid switching time for a Q-switched laser may be understood by reference to FIGURES 8 and 9. FIGURE 8 in the upper portion shows in the dashed line a graph of the oscillation threshold for an optically pumped, Q-switched laser. The solid line shows the available gain which is also a function of the stored energy. Whenever the available gain exceeds the oscillation threshold oscillation will ensue. This rapidly decreases the available stored energy until it falls below the oscillation threshold. As the threshold decreases due to the gradual turning on of the Q-switch, a point is reached when the threshold is again below the available gain and another pulse output is generated. In the specific example illustrated in FIGURE 8, the Q-switch is sufficiently slow to produce three output pulses. It is obviously desirable in many applications to concentrate the energy in a single pulse to the maximum extent possible.

This is accomplished by providing more rapid Q-switching action, as illustrated in FIGURE 9. As will be seen from FIGURE 9, the Q-switching action is fast with respect to the development time for the pulse (approximately $2 \times 10^{-7}$ seconds). Accordingly, the oscillation threshold shown by the dashed line in FIGURE 9 is dropped sufficiently rapidly so that the available gain remains above the oscillation threshold until substantially all of the available stored energy is dissipated in a single laser pulse. It may be noted that in both FIGURE 8 and FIGURE 9 it is contemplated that the starting of the optical excitation, by flashing of the discharge lamp 16 for example, commences sufficiently long in advance of the switching action to allow the stored energy to be built up substantially to a maximum value. In the case under discussion this time would be approximately 0.001 second.

From the foregoing discussion, it will be seen that Q-switching apparatus of an improved type as illustrated in FIGURE 1 provides a capability for releasing stored energy in a single laser pulse of very high intensity. This pulse will be very short and will occur at a predictable time. All of these characteristics are advantageous for particular applications of lasers and, as a specific example, for ranging apparatus such as radar-like apparatus utilizing visible or infrared frequencies rather than radio frequencies.

Output control of lasers by total internal reflection is useful for purposes other than achieving intense controllable pulses from a Q-switched laser. Such output control may be employed to cause the output from a laser to be more highly directional than it would be with a simple cavity comprising plane parallel reflectors. The characteristic of a laser by virtue of which it has a highly directional output is sometimes spoken of in terms of the number of modes generated and emitted in the laser. This is a useful concept in mathematical analysis of laser cavities and is an outgrowth of theoretical studies of modes of propagation of radio frequency energy in microwave cavities and transmission lines. Thus the function of producing a highly directional laser output beam is sometimes referred to as mode selection. The operation of the invention will herein be explained without reference to the concept of modes of propagation, although it could be described and analyzed from that point of view.

Figure 2:
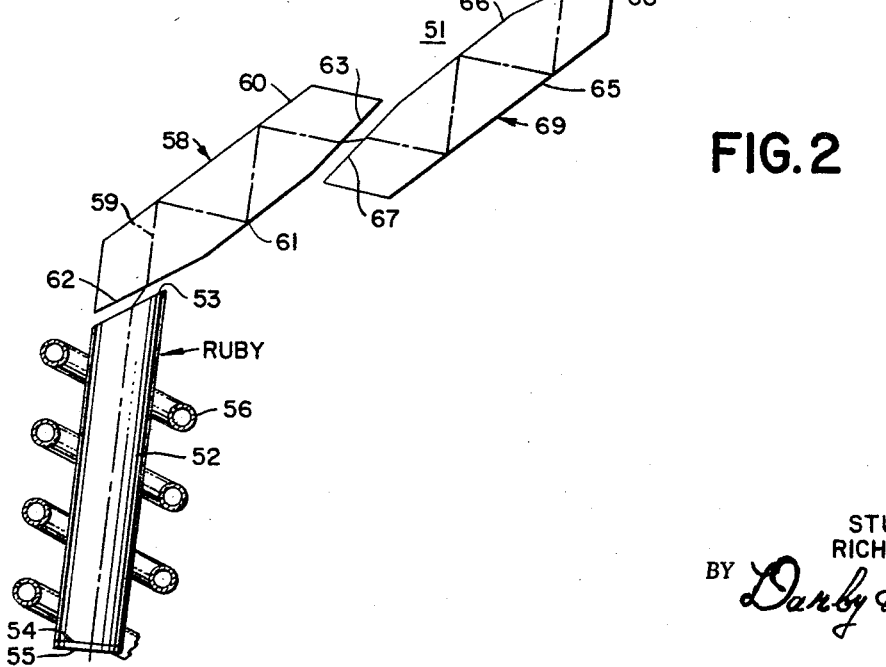
FIGURE 2 is a top plan view, partially schematic, of an alternative form of apparatus according to the invention with propagation direction selection in both the horizontal and vertical planes.

FIGURE 2 shows a laser with mode selection or propagation direction selection provided by total internal reflection according to the present invention.

The device of FIGURE 2 is in many respects similar to the device of FIGURE 1 and it will be appreciated that the explanation of the basic principles of operation previously described with reference to FIGURE 1 are also applicable to FIGURE 2. The laser apparatus 51 in FIGURE 2 comprises a laser medium illustratively shown as a ruby rod 52.

The ruby rod 52 may be provided with a reflecting surface 55 upon one end 54 of the rod while the other end 533 of the rod may be obliquely oriented to reduce transmission losses as previously explained with respect to FIGURE 1.

The laser apparatus 51 is provided with optical elements 58 and 64 which are generally similar to optical elements 18 and 24 in FIGURE 1. Optical element 58 is provided with an entrance face 62 reflecting faces 60 and 61 and an exit face 63. Optical element 64 is provided with an entrance face 67 reflecting faces 65 and 66 and an exit face 68.

The apparatus of FIGURE 2 differs from that of FIGURE 1 in that a ray 59 passing through and emerging from optical elements 58 and 64 encounters a polarization rotator 69 which may take various forms and may typically comprise a half-wave plate polarization rotator.

The function of this plate is to rotate the polarization of the ray 59 through 90° in passing through plate 69 in either direction.

Following polarization rotator 69 the ray 59 encounters further optical elements 71 and 72 which are similar to optical elements 58 and 64 except that in position they are rotated 90° about an axis parallel to the ray 59.

Upon leaving optical elements 71 and 72, ray 59 impinges upon and is reflected back from a plane reflector 73. While the reflectors 55 and 73 have been described as plane reflectors it should be appreciated that one or both of the reflectors of the laser may take the form of retroreflectors in the shape of corner cubes or the like or that other than plane reflectors may be used in certain instances.

The operation of the laser device of FIGURE 2 can be understood by recalling the description of FIGURES 3, 4 and 5. From the description of those figures it will be appreciated that optical elements 58 and 64 are substantially lossless for a given direction of propagation of the ray 59. For directions other than in the favored direction the losses in transmission through optical elements 58 and 64 are substantial even with a small deviation from the optimum direction as shown by FIGURE 7.

The selectivity accomplished by optical elements 58 and 64 is however in only one plane, namely the plane of the paper in FIGURE 2. Optical elements 71 and 72 oriented at 90° are provided to attain directional selectivity in a direction at right angles to that provided by elements 58 and 64 and thereby define a unique direction of propagation for which the losses are minimal. Since the optical elements 58, 64, 71 and 72 are also selective with respect to polarization of the ray 59, it is desirable to rotate the polarization of the ray 90° between optical element 64 and optical element 71 so that the polarization will conform to the orientation of the optical elements. This is readily accomplished by a polarization rotator as illustrated at 69.

It should be noted that while the laser medium and the optical elements are separate and distinct in the illustrated embodiments, it is feasible to form the optical elements of laser material and excite this material to produce laser amplification in the optical elements.

From the foregoing description of the apparatus of FIGURE 2 it will be seen that only light rays within an exceedingly small angle (of direction of propagation) can be transmitted back and forth through the laser apparatus without substantial loss, and accordingly, the oscillation of the laser and its output will be restricted to this direction of propagation. The selectivity so provided is frequently desirable and has previously been obtained by expedients such as very large physical separation of the reflectors. The present apparatus by use of total internal reflection yields a selectivity which is equivalent to that obtained with very great separation of the reflectors but within a small space and with relatively less alignment problem.

From the foregoing explanation it will be appreciated that laser apparatus with particularly effective output control means is provided and that such apparatus is adaptable to provide a laser output which is highly directive or to provide an efficient and readily controllable pulsed laser output or both.

In addition to the modifications and variations to the invention which have been shown or suggested, other variations and modifications will be apparent to those of skill in the art and it is accordingly desired that the scope of the invention not be limited to the particular variations and modifications shown and suggested but that it be determined by reference to the appended claims.

What is claimed is:

1. Laser apparatus with output control utilizing selective total internal reflection comprising a laser medium, means for exciting said medium, and reflecting means for causing light emitted in said laser medium to traverse a substantially repetitive path through said medium, said reflecting means comprising at least one transparent optical element having a plurality of surfaces representing interfaces between the medium of said optical element and the surrounding medium of substantially lower refractive index, said surfaces being disposed at approximately the critical angle of said interface with respect to said light path, said optical element comprising an elongated body of transparent material having two optically flat parallel sides forming said surfaces and at least one entrance face disposed at Brewster's angle to rays impinging on said parallel sides at the critical angle of said material whereby losses are introduced for light propagating in a direction not conforming to said path while light propagating in a direction conforming to said path is substantially totally internally reflected at said surfaces.

2. Apparatus as claimed in claim 1 further including a rotatable reflecting element normally diverting light from said path to produce losses preventing oscillation of the laser, and movable to align emitted light along said path to eliminate the losses and trigger oscillation of the laser.

3. Apparatus as claimed in claim 2 wherein said rotatable reflecting element comprises a continuously rotating speed-doubling reflector.

4. Laser apparatus with output control utilizing selective total internal reflection comprising a laser medium, means for exciting said medium, and reflecting means for causing light emitted in said laser medium to traverse a substantially repetitive path through said medium, said reflecting means comprising at least one transparent optical element having a plurality of surfaces representing interfaces between the medium of said optical element and the surrounding medium of substantially lower refractive index, said surfaces being disposed at approximately the critical angle of said interface with respect to said light path, a rotatable reflecting element comprising a continuously rotating speed-doubling reflector normally diverting light from said path to produce losses preventing oscillation of the laser, and movable to align emitted light along said path to eliminate the losses and trigger oscillation of the laser, and a retroreflecting roof prism, said speed-doubling reflector being located between said laser medium and said roof prism to divert laser light except at the instant of alignment of said optical path through said optical element.

5. Laser apparatus with output control utilizing selective total internal reflection comprising a laser medium, means for exciting said medium, and reflecting means for causing light emitted in said laser medium to traverse a substantially repetitive path through said medium, said reflecting means comprising at least one elongated body of transparent material having two optically smooth and substantially parallel sides forming interfaces between said transparent material and the surrounding medium of substantially lower refractive index, said sides being disposed at approximately the critical angle of said interface with respect to said light path and reflecting means arranged to substantially reverse a portion of said light path through said elongated body so that deviation of light from said path in a direction to cause the angle of incidence to exceed the critical angle for forward transmission will cause the angle of incidence to be less than the critical angle for reverse transmission and vice versa, whereby losses are introduced for light propagating in a direction not conforming to said path while light propagating in a direction conforming to said path is substantially totally internally reflected at said sides of said elongated body.

6. Apparatus as claimed in claim 5 wherein there are two of said bodies of transparent material with said sides of the second of said bodies of transparent material being rotated with respect to said sides of the first of said bodies of transparent material through an angle of 90° about their optical axis thereby providing complete selectivity of direction of propagation.

7. Apparatus as claimed in claim 5 wherein said reflecting means comprises a rotatable reflecting element normally diverting light from said path to produce losses preventing oscillation of the laser, and movable to align emitted light along said path to eliminate the losses and trigger oscillation of the laser.

References Cited
UNITED STATES PATENTS

| | | | |
|---|---|---|---|
| 3,140,451 | 7/1964 | Fox | 331—94.5 |
| 3,248,671 | 4/1966 | Dill et al. | 331—94.5 |

OTHER REFERENCES

Benson et al., New Laser Technique for Ranging Application. NEREM Record (Nov. 5, 1962), p. 34.

Dow, Investigation of Laser Modulation by Modifying the Internal Reflection Barrier. J.O.S.A., vol. 53, No. 8 (August 1963), pp. 915–917.

JEWELL H. PEDERSEN, *Primary Examiner.*

W. L. SIKES, *Assistant Examiner.*